US009564680B2

(12) United States Patent  (10) Patent No.: US 9,564,680 B2
Lehmann                    (45) Date of Patent:     Feb. 7, 2017

(54) REMOVABLE AND REPLACEABLE SOUND TUNNEL SHELL (71) Applicant: Harry V. Lehmann, Novato, CA (US)

(72) Inventor: Harry V. Lehmann, Novato, CA (US)

(73) Assignee: Green Swan, Inc., Novato, CA (US)

(*) Notice: Subject to any disclaimer, the term of this patent is extended or adjusted under 35 U.S.C. 154(b) by 215 days.

(21) Appl. No.: 14/265,267

(22) Filed: Apr. 29, 2014

(65) Prior Publication Data

US 2014/0315607 A1 Oct. 23, 2014

Related U.S. Application Data (63) Continuation-in-part of application No. 12/978,142, filed on Dec. 23, 2010, now Pat. No. 9,191,055, which (Continued)

(51) Int. Cl.
H04M 1/00 (2006.01)
H01Q 1/24 (2006.01)
(Continued)

(52) U.S. Cl.
CPC ............ *H01Q 1/245* (2013.01); *H04B 1/3838* (2013.01); *H04M 1/0202* (2013.01); *H04M 1/0254* (2013.01)

(58) Field of Classification Search
CPC ......... H01Q 1/243; H04B 1/3833; H03C 7/02; H04M 1/0214–1/11
(Continued)

(56) References Cited

U.S. PATENT DOCUMENTS 5,335,366 A  8/1994  Daniels
5,336,896 A  8/1994  Katz
(Continued)

FOREIGN PATENT DOCUMENTS

GB      2327572 A       1/1999
WO  2009/130165 A2     10/2009

OTHER PUBLICATIONS

International Searching Authority, International Search Report PCT/US2012/063376 mailed Jan. 24, 2013, 1pg.
(Continued)

Primary Examiner — Edward Urban
Assistant Examiner — Rui Hu
(74) Attorney, Agent, or Firm — Duane Morris LLP (57) ABSTRACT Mobile devices may minimize the radiation exposure to users by controlling the distance between the user, specifically the head, and the mobile device to a minimum distance. The reduction in exposure is realized due to the operation of the Inverse Square Rule on electromagnetic signal from the mobile device recognizing there is a steep fall off of signal strength resultant from increased distance between the head of the user and the source of the signal. Embodiments increase and maintain operational distance between the user and the broadcast device to reduce signal absorption, while maintaining sound quality and volume. Embodiments enforce the operational distance with physical barriers preventing the distance from being reduced. Embodiments described herein also allow for the retraction of the physical barrier for storage or portage.

13 Claims, 11 Drawing Sheets

Related U.S. Application Data is a continuation-in-part of application No. 12/979,712, filed on Dec. 28, 2010, now Pat. No. 9,065,900, application No. 14/265,267, which is a continuation-in-part of application No. 13/667,958, filed on Nov. 2, 2012.

(60) Provisional application No. 61/290,492, filed on Dec. 28, 2009, provisional application No. 61/290,493, filed on Dec. 28, 2009, provisional application No. 61/290,854, filed on Dec. 29, 2009, provisional application No. 61/312,060, filed on Mar. 9, 2010, provisional application No. 61/312,159, filed on Mar. 9, 2010, provisional application No. 61/315,316, filed on Mar. 18, 2010, provisional application No. 61/316,778, filed on Mar. 23, 2010, provisional application No. 61/332,021, filed on May 6, 2010, provisional application No. 61/377,824, filed on Aug. 27, 2010, provisional application No. 61/554,746, filed on Nov. 2, 2011, provisional application No. 61/817,114, filed on Apr. 29, 2013.

(51) Int. Cl.
*H04B 1/3827* (2015.01)
*H04M 1/02* (2006.01)

(58) Field of Classification Search
USPC ................. 455/90.3, 106, 575.1–575.8
See application file for complete search history.

(56) References Cited

U.S. PATENT DOCUMENTS

| | | | |
|---|---|---|---|
| 5,524,275 A | 6/1996 | Lindell | |
| 5,530,919 A | 6/1996 | Tsuru et al. | |
| 5,541,609 A | 7/1996 | Stutzman et al. | |
| 5,787,340 A | 7/1998 | Sepponen | |
| 5,956,626 A | 9/1999 | Kaschke et al. | |
| 6,075,977 A | 6/2000 | Bayrami | |
| 6,259,896 B1 | 7/2001 | Sepponen | |
| 6,341,217 B1 | 1/2002 | Wong | |
| 6,404,403 B1 | 6/2002 | Kunz et al. | |
| 6,456,856 B1 | 9/2002 | Werling et al. | |
| 6,505,036 B2 | 1/2003 | Zilberberg et al. | |
| 6,535,606 B2* | 3/2003 | Cox | H04M 1/05 379/449 |
| 6,615,026 B1 | 9/2003 | Wong | |
| 6,631,279 B2* | 10/2003 | Rivera | H04B 1/3838 379/430 |
| 6,785,519 B2 | 8/2004 | Toyoda et al. | |
| 6,800,420 B2 | 10/2004 | Song et al. | |
| 6,934,515 B2 | 8/2005 | Wallach | |
| 7,146,139 B2 | 12/2006 | Nevermann | |
| 7,499,722 B2 | 3/2009 | McDowell et al. | |
| 8,340,338 B2* | 12/2012 | Mlodzikowski | H04R 1/1016 381/328 |
| 8,350,451 B2 | 1/2013 | Bright et al. | |
| 8,385,004 B2* | 2/2013 | Hicks | G03B 41/00 359/699 |
| 8,577,412 B1* | 11/2013 | Bishop | H04M 1/0281 439/660 |
| 8,629,771 B2 | 1/2014 | Anderson et al. | |
| 8,760,569 B2* | 6/2014 | Yang | G06F 1/1632 348/373 |
| 2002/0028699 A1 | 3/2002 | Moquin et al. | |
| 2002/0071551 A1 | 6/2002 | Lee | |
| 2002/0072337 A1* | 6/2002 | Teller | H04B 1/3838 455/106 |
| 2006/0164011 A1 | 7/2006 | Lee et al. | |
| 2006/0234780 A1* | 10/2006 | Ramsden | H04M 1/6058 455/569.1 |
| 2009/0125083 A1 | 5/2009 | Maples | |
| 2010/0113111 A1 | 5/2010 | Wong et al. | |
| 2010/0128916 A1* | 5/2010 | Bradford | H04R 1/1058 381/386 |
| 2010/0156624 A1 | 6/2010 | Hounsell | |
| 2010/0234081 A1 | 9/2010 | Wong et al. | |
| 2011/0122596 A1 | 5/2011 | Miyazaki et al. | |
| 2011/0159920 A1 | 6/2011 | Lehmann | |

OTHER PUBLICATIONS

Swicord, M.L., Davis, C.C., "An Optical method for Investigating the Microwave Absorption Characteristics of DNA and other Biomolecules in Solution," Journal of Bioelectromagnetics, 1983; vol. 4(1);21-42; abstract.

* cited by examiner

REMOVABLE AND REPLACEABLE SOUND TUNNEL SHELL

CROSS REFERENCE

This application is a Continuation in Part of Co-pending non-provisional application Ser. No. 13/667,958 filed on 2 Nov. 2012 entitled "METHOD AND SYSTEM TO MINIMIZE RADIATION EXPOSURE FROM MOBILE PHONES AND DEVICES" which is a Continuation in Part of Co-pending non-provisional application Ser. No. 12/978,142 filed 18 Mar. 2010 entitled "METHOD AND SYSTEM TO MINIMIZE RADIATION EXPOSURE FROM MOBILE PHONES AND DEVICES" which is a non-provisional application of and claims priority of provisional applications: Application No. 61/290,492 entitled METHOD AND DEVICE FOR RADIO WAVE SHIELDING THROUGH INCORPORATION OF DIELECTRIC MATERIAL WAVE BARRIER IN ELECTRONIC DEVICE filed 28 Dec. 2009; Application No. 61/290,493 entitled METHOD AND DEVICE FOR RADIO WAVE SHIELDING THROUGH INCORPORATION OF A TRANSPARENT, SEMI-TRANSPARENT, OR OPAQUE DIELECTRIC filed 28 Dec. 2009; Application No. 61/290,854 entitled METHOD AND DEVICE FOR RADIO WAVE SHIELDING THROUGH INCORPORATION OF A TRANSPARENT, SEMI-TRANSPARENT, OR OPAQUE OR SOLID DIELECTRIC WAVE BARRIER FOR THE FACEPLATE OF ELECTRONIC COMMUNICATION DEVICES, INCLUDING CELLULAR TELEPHONE, PORTABLE TELEPHONE, AND HANDHELD RADIO AND ENTERTAINMENT DEVICES filed 29 Dec. 2009; Application No. 61/312,060 entitled HINGED FOLD-OVER SWITCH ACTIVATING DISTANCE INSERTION DEVICE filed 9 Mar. 2010; Application No. 61/312,159 entitled SPRING-LOADED SWING-OUT ARM DISTANCE INSERTION DEVICE FOR APPLICATION TO CELLULAR TELEPHONES filed 9 Mar. 2010; Application No 61/315,316 entitled SONIC-SWITCH DISTANCE WARNING DEVICE FOR APPLICATION TO CELLULAR TELEPHONES filed 18 Mar. 2010; Application No. 61/316,778 entitled DEPTH OF FIELD TUNED AND PATTERN RECOGNITION PROXIMITY WARNING DEVICE AND METHOD FOR APPLICATION TO CELLULAR TELEPHONES AND OTHER RADIO TRANSMISSION EQUIPMENT filed 23 Mar. 2010; Application No. 61/332,021 entitled PROXIMITY WARNING SOFTWARE FOR CELLULAR TELEPHONES APPLICATIONS filed 6 May 2010; and Application No. 61/377,824 entitled ANGLE OF INCIDENCE MEASUREMENT BASED WARNING DEVICE FOR CELL TELEPHONES filed 27 Aug. 2010. This application is also a Continuation In Part application of and claims priority benefit of non-provisional application Ser. No. 12/979,712 entitled METHOD AND SYSTEM TO SHIELD MOBILE PHONES AND DEVICES TO MINIMIZE RADIATION EXPOSURE filed 23 Dec. 2010, which is a non-provisional application of and claims priority of provisional applications: Application No. 61/290,492 entitled METHOD AND DEVICE FOR RADIO WAVE SHIELDING THROUGH INCORPORATION OF DIELECTRIC MATERIAL WAVE BARRIER IN ELECTRONIC DEVICE filed 28 Dec. 2009; Application No. 61/290,493 entitled METHOD AND DEVICE FOR RADIO WAVE SHIELDING THROUGH INCORPORATION OF A TRANSPARENT, SEMI-TRANSPARENT, OR OPAQUE DIELECTRIC filed 28 Dec. 2009; Application No. 61/290,854 entitled METHOD AND DEVICE FOR RADIO WAVE SHIELDING THROUGH INCORPORATION OF A TRANSPARENT, SEMI-TRANSPARENT, OR OPAQUE OR SOLID DIELECTRIC WAVE BARRIER FOR THE FACEPLATE OF ELECTRONIC COMMUNICATION DEVICES, INCLUDING CELLULAR TELEPHONE, PORTABLE TELEPHONE, AND HANDHELD RADIO AND ENTERTAINMENT DEVICES filed 29 Dec. 2009. This application is also a non-provisional application of and claims priority of provisional application 61/554,746, entitled FLEXIBLE MOBILE TELEPHONE SOUND TUNNEL SHELL, filed 2 Nov. 2011. The entirety of each application referenced above is incorporated herein by reference.

The present application also claims priority benefit of U.S. Provisional Application No. 61/817,114 filed 29 Apr. 2013 entitled "Removable and Replaceable Sound Tunnel Shell" the entirety of which is incorporated herein by reference.

BACKGROUND

The need for the present invention is clearly apparent. A growing body of evidence indicates that the non-ionizing radiation from cellular devices, particularly over long term use, or particularly in the instance of children and teens whose skulls have not hardened (and whose heads are typically smaller in volume).

Substantial empirical research demonstrates a positive correlative relationship between close exposure to cellular telephone microwave signal and physiological changes sometimes associated with deterioration in human health. The relationship between microwave signal from cellular devices and health is not controversial, though the extent and type of such relationship remains debated.

The fact of such a relationship is non-controversial is demonstrated by the presence of warnings in the supporting documentation sold with all or most cellular devices. Typically a small booklet is deployed to the consumer at the point of sale in packaged company with the sold cellular device. In some other instances, particularly with one manufacturer, the paper documentation is slight, but the end user is directed to descriptive materials, corresponding in practical effect to a user's manual. In pertinent point, the user's manuals sold with cellular devices in the United. States, Europe, and elsewhere contain concise warnings to the consumer based upon a testing regime called Specific Absorption Rate, which is the industry-accepted criteria for the measurement of projected risk from exposure to cellular devices. Below are sample industry defined in 2011 as safe distances, based upon an industry standard expectation of a maximum of 1.6.

| CELL PHONE MODEL | SAR (HEAD) | SAR (BODY) | MIN Spatial Distance |
|---|---|---|---|
| HTC Evo 3D | 0.88 W/kg @1 g | 1.11 W/kg @1 g | 0.40 inches (1 cm) |
| HTC Sensation 4G | 1.40 W/kg @1 g | 0.70 W/Kg @1 g | 0.59 inches (1.5 cm) |
| T-Mobile My Touch 4G | 0.94 W/kg @1 g | 1.03 W/kg @1 g | None obtainable |
| HTC Thunderbolt | 1.20 W/kg @1 g | 1.46 W/kg @1 g | 0.50 inches (1.3 cm) |
| Motorola Droid Bionic | 0.88 W/kg @1 g | 0.94 W/kg @1 g | 1.00 inches (2.5 cm) |
| T-Mobile G2x | 0.83 W/kg @1 g | 0.72 W/kg @1 g | 0.79 inches (2 cm) |

| CELL PHONE MODEL | SAR (HEAD) | SAR (BODY) | MIN Spatial Distance |
| --- | --- | --- | --- |
| Motorola Atrix 4G | 1.47 W/kg @1 g | 1.35 W/kg @1 g | 1.00 inches (2.5 cm) |
| Apple Iphone 4G | 0.97 W/kg @1 g | 0.69 W/kg @1 g | 0.62 inches (1.55 cm) |
| Motorola Phantom 4G | 0.93 W/kg @1 g | 0.91 W/kg @1 g | 1.00 inches (2.5 cm) |
| Samsung Charge | 1.01 W/kg @1 g | 1.00 W/kg @1 g | 0.59 inches (1.5 cm) |

While the industry standards for such distances are typically stated as being in reference to the risks of heat accumulation from microwave induced vibration ("slow cook"), other scientific studies have empirically demonstrated the existence of a direct relationship between the non-ionizing radiation from cellular devices and physiological changes in the bodies of the users of cellular telephones, including the head and brain. Thus, an article just published in the Journal Of The American Medical Association (JAMA), titled Effects of Cell Phone Radiofrequency Signal Exposure on Brain Glucose Metabolism, written by a team of scientists from the National Institutes of Health, headed by Nora D. Volkow.

As stated in the Abstract (http:l/jama.ama-asn.org/content/305/8/808), published on Feb. 23, 2011, the Volkow team found that "50-minute cell phone exposure was associated with increased brain glucose metabolism in the region closest to the antenna," which increased glucose metabolism were in term visible on MRI examination. The Volkow findings are significant in that they document actual direct non-thermal effect, the very existence of which had sometimes been contested, despite prior studies and evidence to the contrary.

The ultimate significance of this new JAMA study is that while some in the cellular telephone industry had previously asserted that there was no possible direct effect upon the brain from cellular telephone exposure, the Volkow study found a direct relationship between cellular telephone use and brain metabolism, long before the levels of radio wave exposure necessary to generate heat.

On Apr. 24, 2013 the International Agency For Research On Cancer of The World Health Organization, announced its findings classifying cellular telephone electromagnetic field exposure as a possible carcinogen. These forms of electromagnetic radiation have been categorized as a Group 2B carcinogen along with lead, automobile exhaust and other toxic substances. A summary of the findings of this just-published monograph can be found at: http://monographs.iarc.fr/ENG/Monographs/voll02/mono102-005-006.pdf Internationally esteemed environmental scientist Joel M. Moskowitz in his press release on the newly-released WHO standards notes that, according to the monograph "Positive associations have been observed between exposure to radiofrequency radiation from wireless phones and glioma and acoustic neuroma" (p. 421), and: "Radio frequency electromagnetic fields are possibly carcinogenic to humans (Group 2B)." (p. 421). Dr. Moskowitz also noted in his April 24 publication that; Children are particularly vulnerable as "the average exposure from use of the same mobile phone is higher by a factor of 2 in a child's brain and higher by a factor of 10 in the bone marrow of the skull." Also, the child's brain is developing at a much greater rate than the adult's brain.

Many empirical studies have by demonstrated physical effect, such as the work of Dr. Henry Lai at The University of Washington, the Lund University experiments, and many others. Many other studies show that a solid empirical basis for concern about the effects of modulated microwave on human tissue [i.e. H. Lai et al, from the University of Washington, 1984, 1988, and as presented in 1998) Vienna, Austria, and 2009 in Stavanger, Norway; O. Johansson, Associate Professor, Dept. of Neuroscience of the Karolinska Institute, Stockholm, and Professor, Royal Institute of Technology, Stockholm, as presented in 2009 at Stavanger, Norway; Carl F. Blackman a founder of the Bioelectromagnetics Society, as presented in 2009, at Stavanger, Norway; Martin Blank, Ph.D., Associate Professor, Columbia University, as presented in 2009 Stavanger, Norway, Franz Adlkofer, M.D., doctorate from the Max Planck Institute for Biochemistry as presented at Stavanger Norway, 2009, also the following presenters at the International E:tvlF Conference 2009 at Stavanger) Norway: Lukas H. Margaritis, Ph.D, Greece; Elihu D. Richter, MD, M.PH., Israel; Alvaro Agusto A. de Salles, Ph.D., Brazil; Fredrik Soderqvist, Ph.D., Sweden, Yuri G. Grigoriev M, D. Sci., Russia; Anton V. Merkulov Ph.D., Russia], have shown potential health risks, in some instances showing DNA breakage associated with human exposure to non-ionizing radio wave sources, including but not limited to those emitted from mobile telephone devices and handsets, including but not limited to cellular telephones.

More recent scientific writing in this regard, including in 2012 and 2013 has underlined a causal relationship between extended exposure to pulsed microwave signals and human health. Such recent findings have included the Jul. 12, 2012 letter from the President of the American Academy of Pediatrics, Robert W. Block, MD, FAAP, to The Honorable Julius Genachowski, Commissioner, Federal Communications Commission, in which, on behalf of the American Academy of Pediatrics the FCC was again notified that: "In the past few years, a number of American and international health and scientific bodies have contributed to the debate over cell phone radiation and its possible link to cancer. The International Agency for Research on Cancer (IRAC), part of the United Nations World Health Organization, said in June 2011 that a family of frequencies that includes mobile-phone emissions is "possibly carcinogenic to humans." The letter does state that cell phones cause cancer, but cites academic reasons for concern justifying further study.

See also the findings of Board Certified Pediatric Neurologist at the Harvard Medical School Martha R. Herbert, who states in her letter to the Los Angeles Unified School District dated Feb. 8, 2013, referencing her 60 page study with over 550 citations which can be found at: www.bio-initiative.org/report/wpcontent/uploads/pdfs/sec20_2012findings_in_Autism.pdf In the above referenced letter, as found in the study to which it refers Dr. Herbert finds that EMF/RFR from wifi and cell towers can exert a disorganizing effect on the ability to learn and remember, and can also be destabilizing to immune and metabolic function." This letter and the study crucially indicate that the effects involved are non-thermal, meaning that they do not result from the microwave heating of tissue but are biological changes resulting directly from microwave contact with the tissues involved.

The recent work at the Kaiser Permanente Division of Research by De-Kun Li, 110, PhD, MPH has shown in a study in which 733 women were given a meter to carry during pregnancy, and their EMF exposure was measured, that, after 13 years, childhood obesity was greater in the children whose mothers had higher E11F readings than in those whose mothers had lower EMF readings, and that the change in obesity outcome was dose-responsive, with a 2.3 fold increased risk in children who were followed until the end of the study after thirteen years.

Thus, a considerable body of work briefly touched upon here shows an empirical basis for the concern that pulsed microwave has non-thermal results upon human health. There is, further, a considerable body of evidence indicating that close proximity, due to the operation of The Inverse Square Rule, will result in much higher dosage levels will occur, such as from cellular devices, when they are held close to the body or head.

Consequently, devices, such as the within unique invention here filed) which provide fine sound quality, while also providing for increased distance between the body (including the head) and a source of pulsed microwave (such as a 3G or 4G mobile phone) will indisputably provide, due to The Inverse Square Rule, the user with a reduced level of absorbed microwave.

Cellular devices now in the possession six billion customers. The value of the invention here filed resides from that vast pool of users for reasons which include the following: 1) The invention unquestionably reduces the level of radiation to which the mobile phone users brain is exposed, due to the operation of the inverse square law, or sometimes stated as the inverse square rule, that the strength of the radio signal is inverse to the square of the distance from the source, which results in very rapid falloff of signal density, including as absorbed, and: 2) While simultaneously aiding the safety of cellular phone users, the invention assists the cellular telephone industry in avoiding liability, because of reduced exposure due to reduced number and severity of injury, and because of the quality of warning which results from dispensing the product, which increased quality of warning has an insulating effect, and: 3) In addition to the possible benefits to users, market and ethical value in the invention stemming from education of persons who may not directly benefit from the use of proximity avoidance from a radiation reduction standpoint, but who nonetheless gain peace of mind through taking various prudent steps towards limitation of EMF contact, including those who merely witness the invention being used by others.

U.S. Patent and Trademark Office application Ser. No. 12/978,142, was filed on Dec. 23, 2010, in turn incorporating the large number of relevant provisional. The provisional which were incorporated by reference in Ser. No. 12/978,142 include nine different Provisional filings. That application included proximity warning systems relating to cellular telephony and structures intended to provide end-users with protection from non-ionizing radiation through structures integrated upon cellular devices or cases.

U.S. Patent and Trademark Office Ser. No. 13/667,958 is specific to a sound tunnel of the sort discussed here, and improved upon by this filing. Said U.S. Patent and Trademark Office filing Ser. No. 13/667,958 includes filing for a clip on flexible mobile sound tunnel device, as illustrated in Ser. No. 13/667,958.

Further research and field testing has continued since the recent first manufacture of the sound tunnel device which is included within Ser. No. 13/667,958. Inventor here submits are new device which provides for a clip-on sound tunnel as set forth in Ser. No. 13/667,958 but provides claims setting forth novel improvements to the method and device which greatly improve user convenience particularly in regard to pocket placement of the integrated device.

The previously filed patent in this area includes the clip on flexible mobile sound tunnel, which slips over the top of virtually any cellular "smart phone" and provides a comfortable "ear bud" such that the combination of elements, the clip the sound tunnel, and the protective disk (preventing intrusion into the ear) provide clear conversation in which ambient noise is reduced, clarity of words heard is increased, and the interposition of more than an inch of additional distance between the cellular device and the user's brain results in a severe reduction in the density of wattage available to be absorbed by the brain of the user of the device, commercially called The Cell Spacer, for which name suitable protections are claimed and have been filed.

As hereafter articulated, this filing is for as an integrated component in a system and method for attachment to cellular telephonic devices and similar equipment, such that, once installed, such that the tunnel shell can be moved 90 degrees or there about from its "in operation" position over a "smartphone" to a storage reside at the top, side or bottom of the phone, to facilitate placement in the pocket or case of the end user, while the clip-on body or mounting bracket (referred herein also as "mount") of the device remains clipped or otherwise attached to a cellular telephonic device including as described in parent U.S. Patent and Trademark Office Application Ser. No. 12/978,142 and Ser. No. 13/667,958.

Embodiments described herein are both for a detachable and re-insert movable sound tunnel shell as well as for a movable sound tunnel feature, such that the sound tunnel, while remaining in physical contact with the clip-on body of the sound tunnel mount to which it is attached, may be moved ninety degrees or there abouts in angular displacement from its operational status to another placement at the top of the a cellular phone or similar equipment as a part of an integrated system, thereby offering increased convenience to the end user in terms of pocket placement or storage in a briefcase or purse. Also envisioned are embodiments in which the sound tunnel is collapsible.

Embodiments described herein for two devices, both devices involving two pieces, each one a new variant of a sound tunnel attachable to a cellular telephone. Through operation of this invention in the context of a Sound Tunnel Shell attached to a cellular or similar device, with the Tunnel Shell moved to a position 90 degrees from its position during operation, the integrated device is rendered easy to carry by pocket, and the plastic attachment clip-on mount need not be removed from the smart phone in order to place the phone in a pocket or purse.

Figure 4:
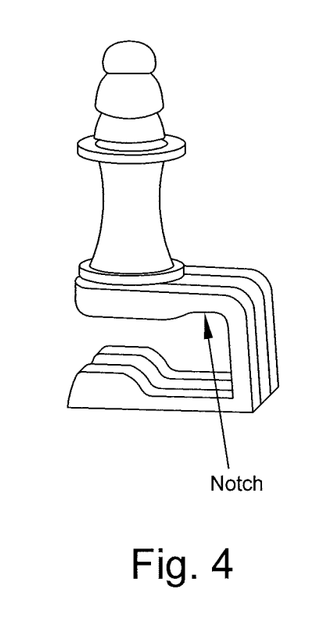
FIG. 4 illustrates the integrated clip-on mounting bracket, either one piece or two piece with movable tower where a notch is molded into the base of a snap-on sound tunnel shell.
Figure 5:
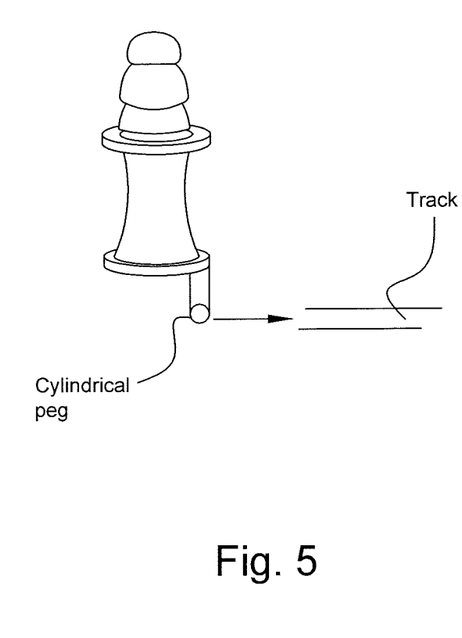
FIG. 5 illustrates the clip-on mounting bracket showing a cylindrical peg extending laterally from the body of the sound tunnel shell such that the sound tunnel shell can be moved from its operational position to another position while remaining in tight contact with and over the clip on mounting bracket.
Figure 6A:
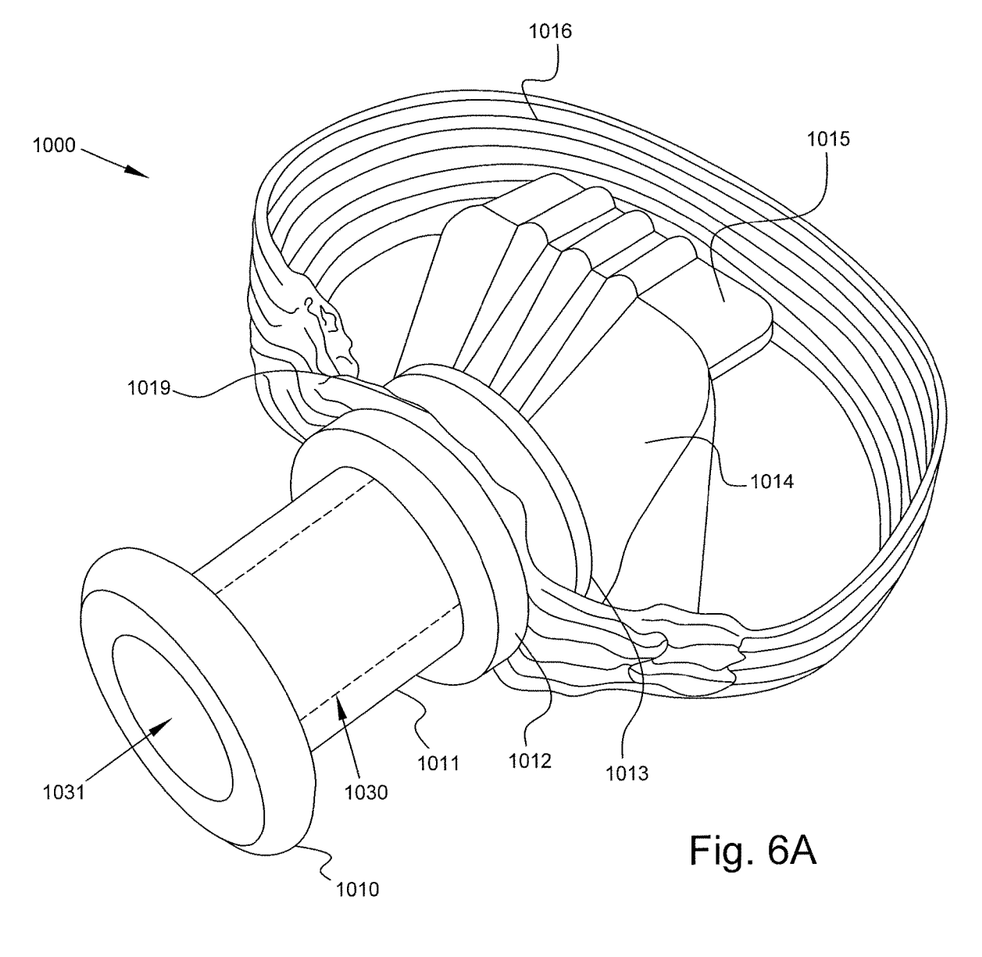
FIGS. 6A-6D illustrate several embodiments of removable physical separating devices enforcing the minimum distance.
Figure 6B:
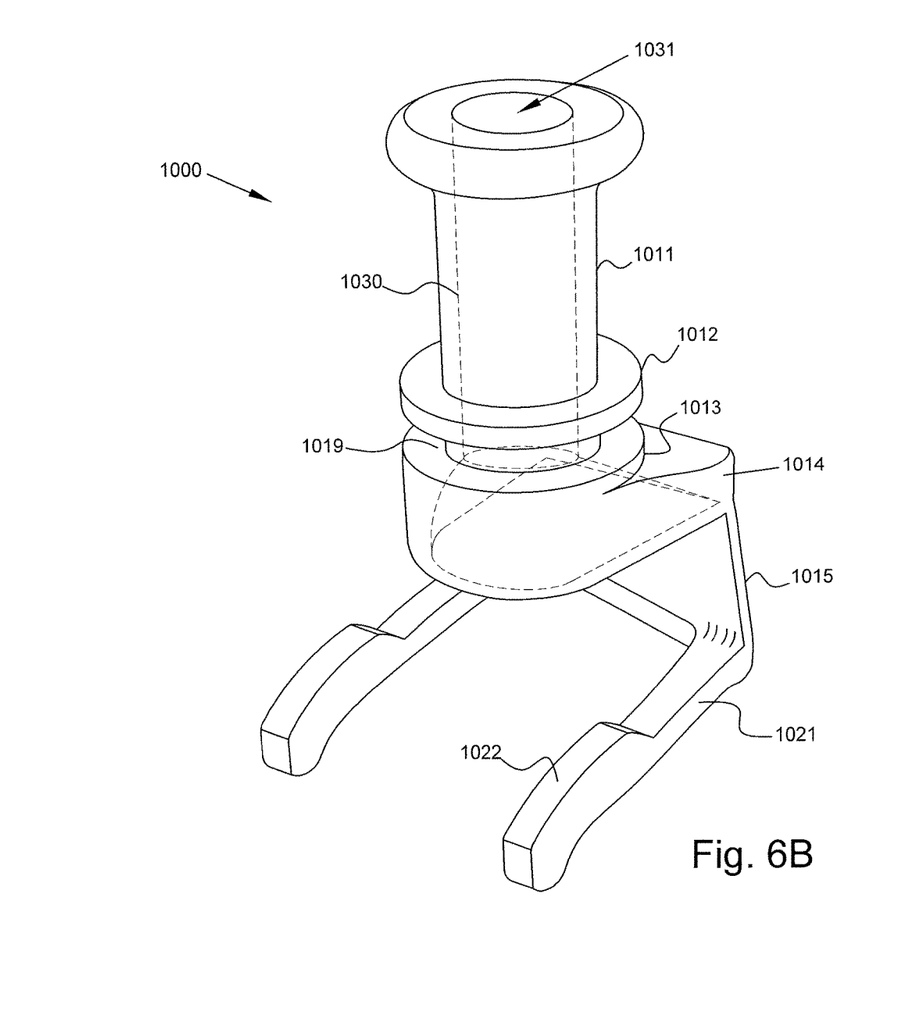
Figure 6C:
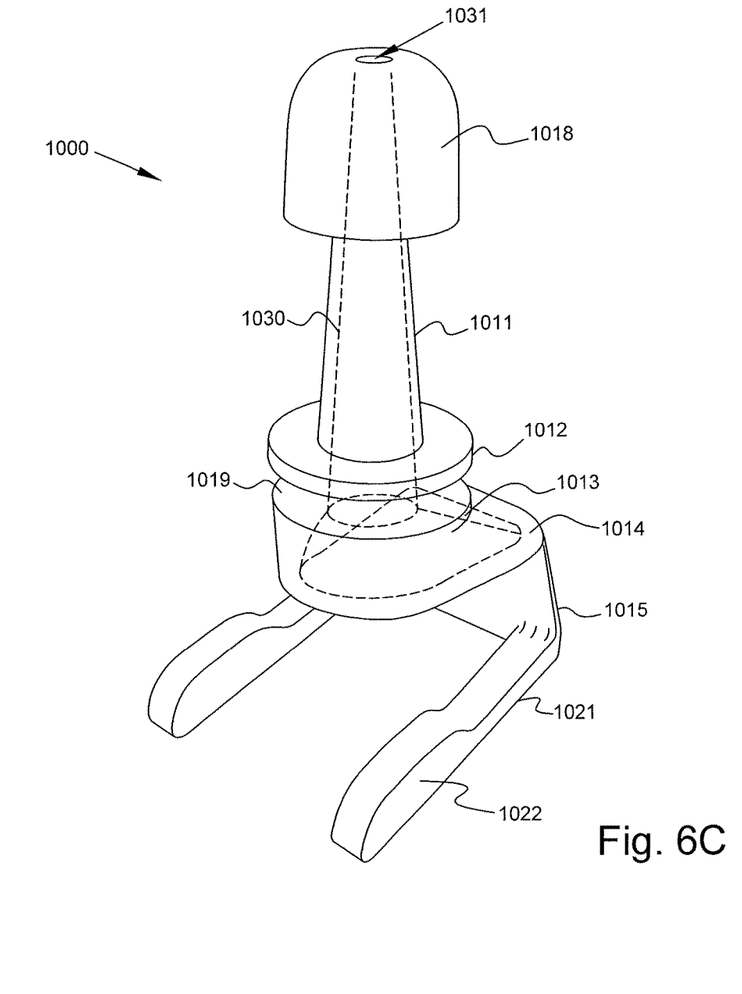
Figure 6D:
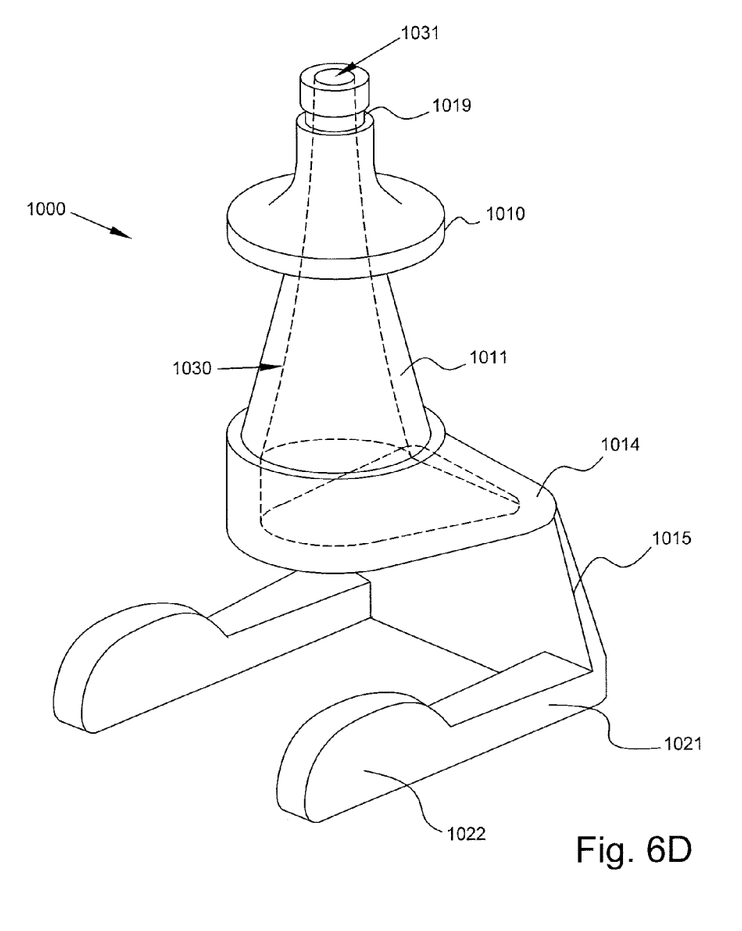
Figure 7A:
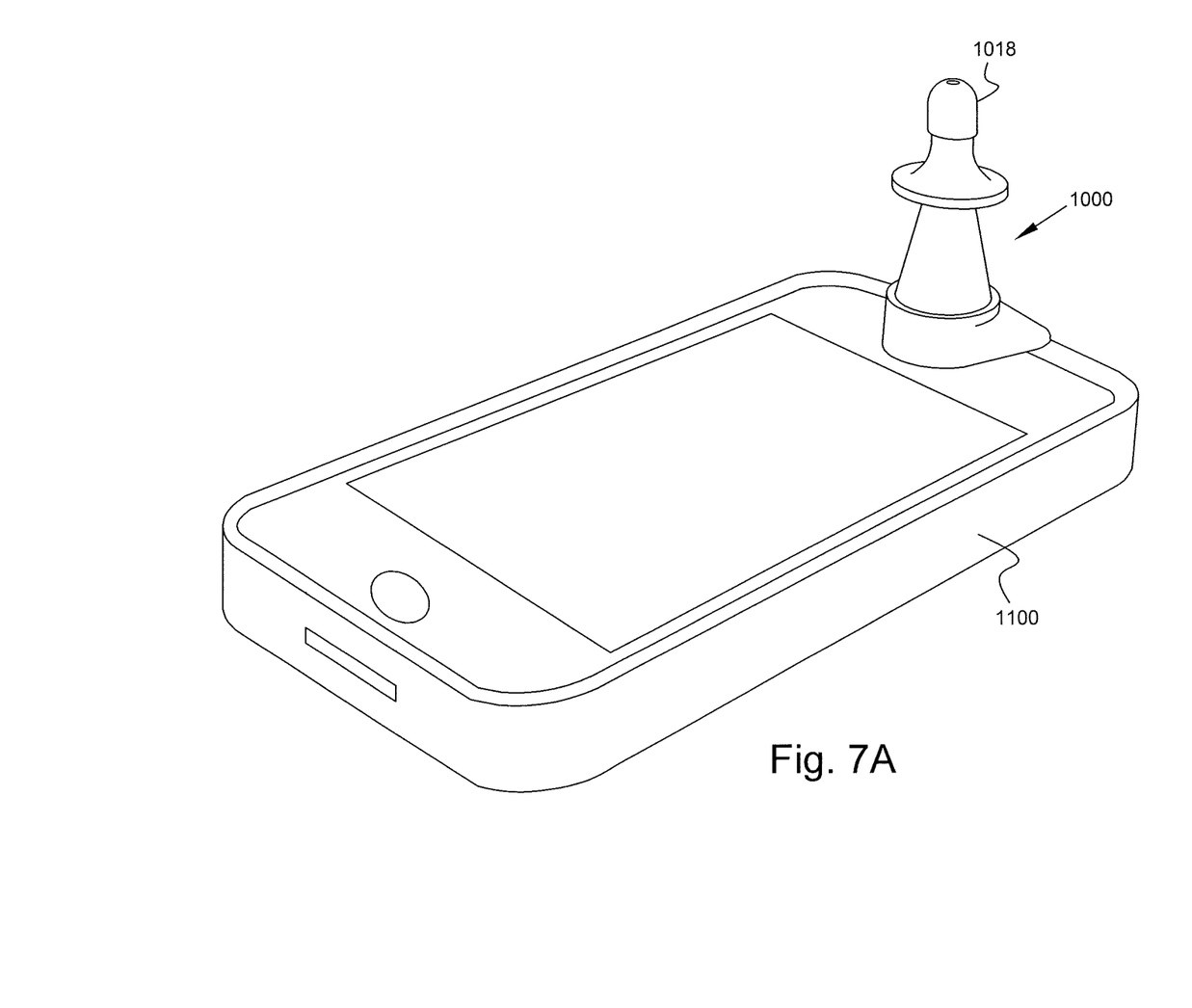
FIGS. 7A-7B illustrate an embodiment of the removable physical separating device attached to exemplary mobile device.
Figure 7B:
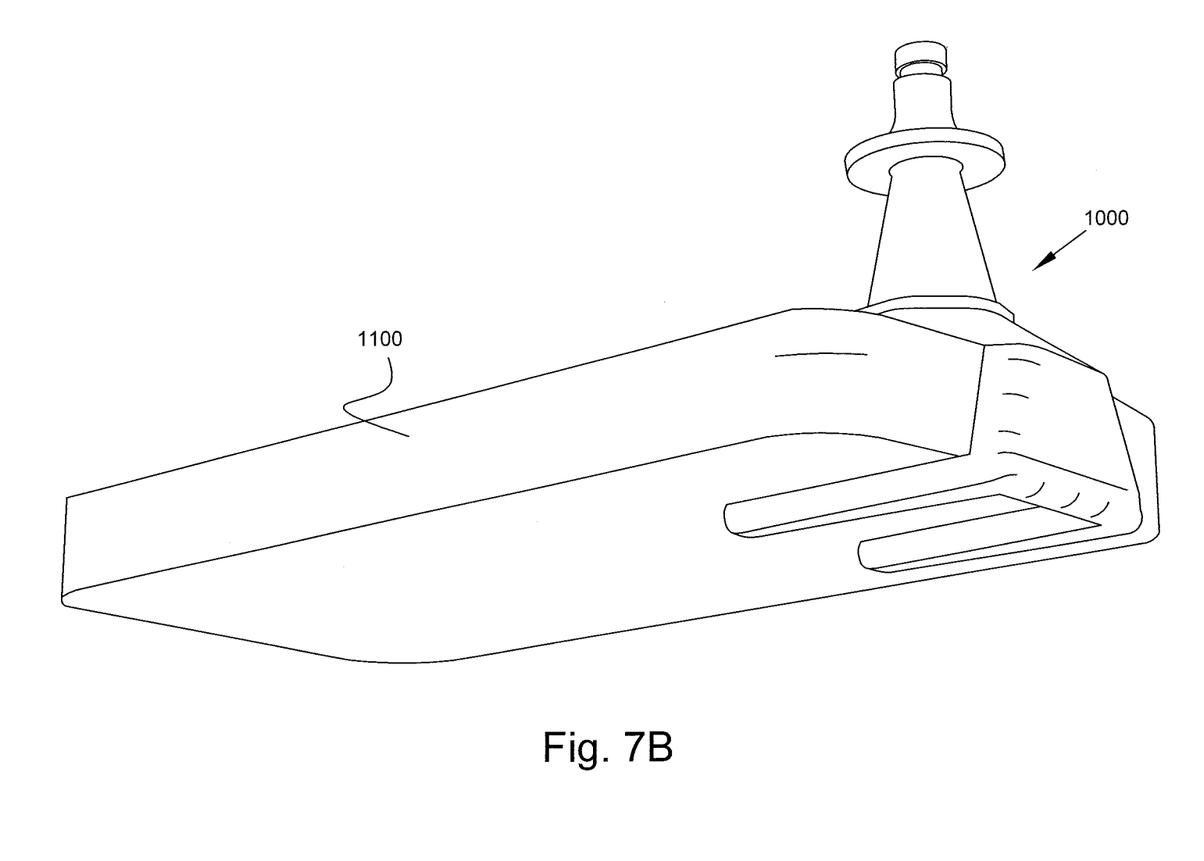

An Embodiment is also described with a notch molded into the base of a snap on Sound Tunnel Shell where the plan of the periphery such device encounters the upper screen area of the smartphone, situate above the speaker thereto and perpendicular to the plane of the screen, such that by the forming of such notch into the design of that base, accommodation is made thereby for the risen rim of a cellular case at elevation above the touchscreen, thereby facilitating fit with a wider range of cellular devices as such notch is shown in FIG. 4, while also easing application of the device and reducing the potential for interference with control buttons situated on the top of the cellular device involved.

These and many other objects and advantages of the present subject matter will be readily apparent to one skilled in the art to which the invention pertains from a perusal of the claims, the appended drawings, and the following detailed description of preferred embodiments.

DETAILED DESCRIPTION

The here-filed invention preserves all of the advantages of the Art set forth in the clip-on aspects and Figures of U.S. Patent and Trademark Office application Ser. No. 12/978,142, and as more particularly set forth in Ser. No. 13/667,958, and as illustrated above, but provides for enhanced user convenience by allowing the sound tunnel shell to either be removed from the clip on mounting bracket and then re-attached on suitable tracks at a ninety degree remove, or for the sound tunnel shell to be moved along a track, in such a manner that narrowed protrusions on the base, which may also be cylindrical, allow the sound tunnel shell to be moved "back" on the device and to traverse a 90 degree angle, and to then be installed such that its resting (storage) position is 90 degrees from its operational provision, as in the attached Figures illustrating the invention here filed.

Figure 1A:
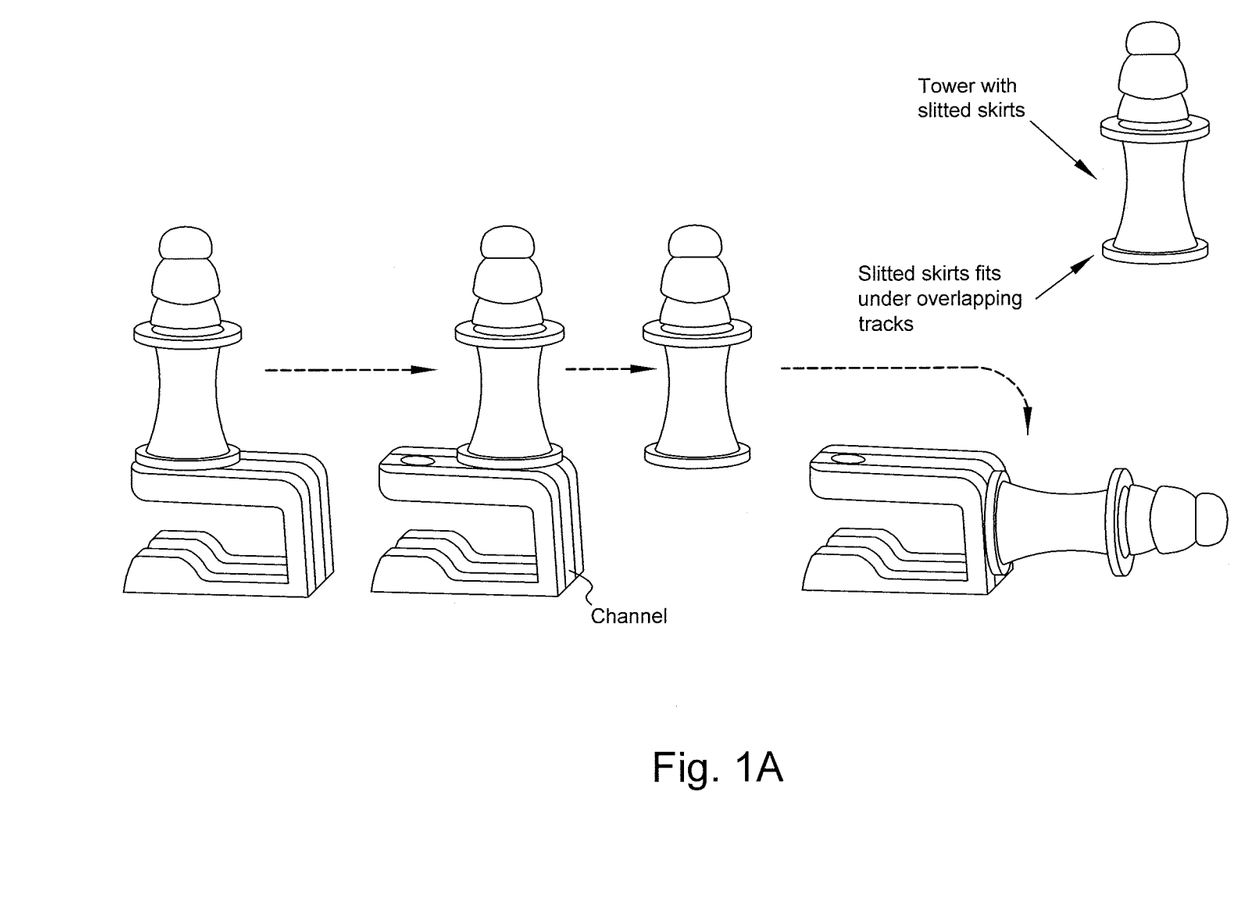
FIGS. 1A and 1B illustrate a cylindrical peg or bushing extending laterally from beneath a removable and replaceable sound tunnel shell such that the peg anchors within the track.
Figure 1B:
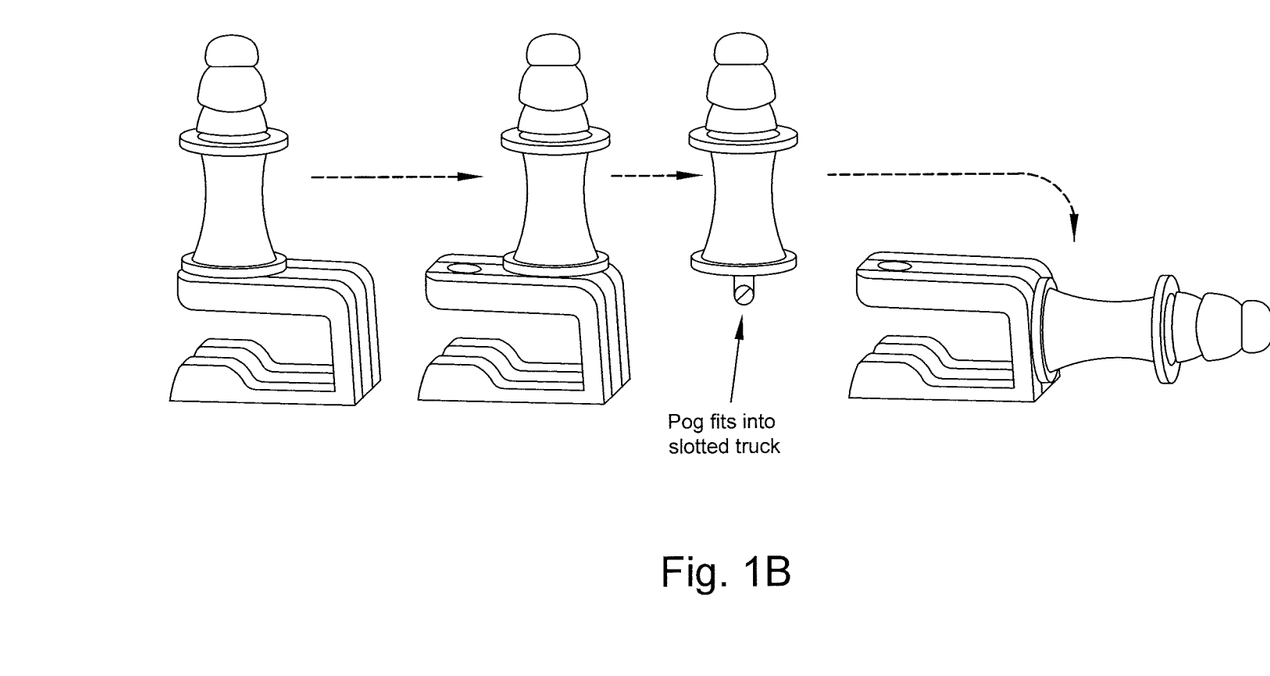

The Removable Sound Tunnel Variant as illustrated in FIG. 1 hereto, in the Removable Sound Tunnel Shell variant, the "tunnel shell" is mounted onto the body of the attachment clip by tracks, and removed at will, and then re installed in a position 90 degrees variant from the original position.

The Removable Sound Tunnel Shell may also be manufactured by means of the crafting of male threads on the bottom of the sound tunnel, with reciprocal female threading on the clip-on mounting bracket, such that the sound tunnel may be unscrewed from its operational position over the speaker of the smartphone; and then re-installed on the back (or from the perspective of the smartphone "top" which is the storage position, also by screw.

Figure 2:
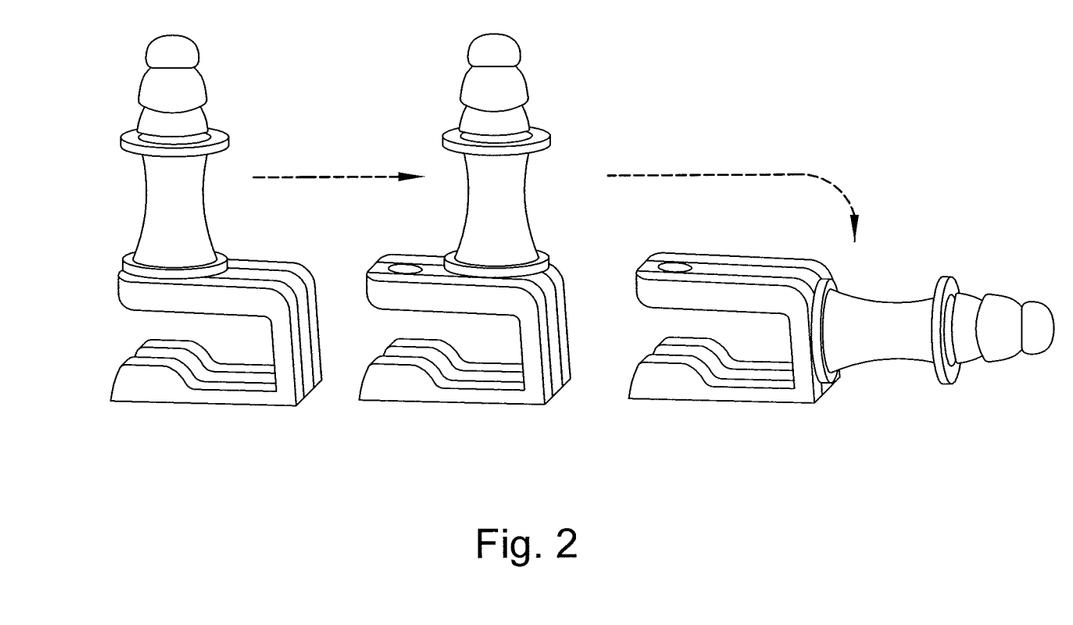
FIG. 2 illustrates a movable sound tunnel shell with a peg in a track.

The Integrated And Internally Movable Variant as illustrated in FIG. 2 attached hereto, in the Internally-Movable variant, the Sound Tunnel Shell is permanently installed upon a track with a curve connecting two tracks, each 90 degrees from the other, such that the Tunnel Shell, once installed, can be moved from an "in use" position to a "pocket" position at the user's perceived convenience.

Advantages to both invented systems include that the design is such that only two injection molded parts are necessary for either variant, at production expense and production logistics advantage over any prior variant.

Figure 3A:
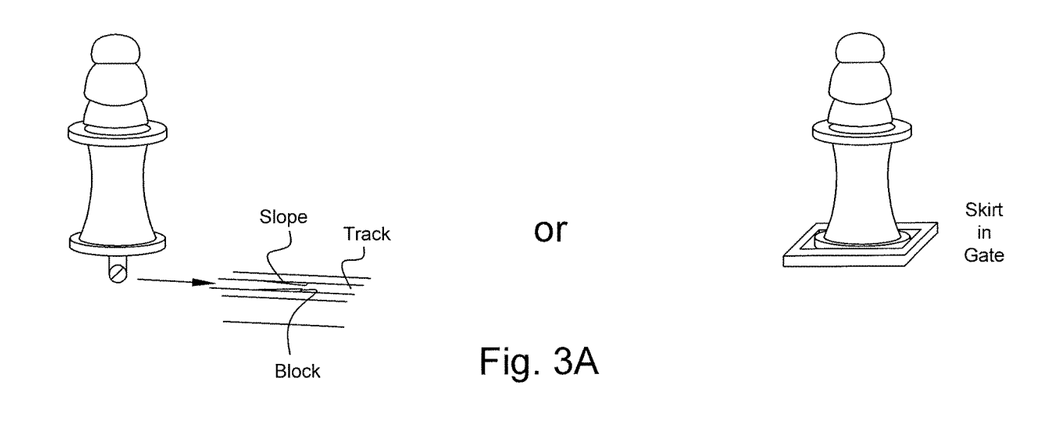
FIG. 3A illustrates a peg entry to one way gate track fit to skirt of Sound tunnel shell.
Figure 3B:
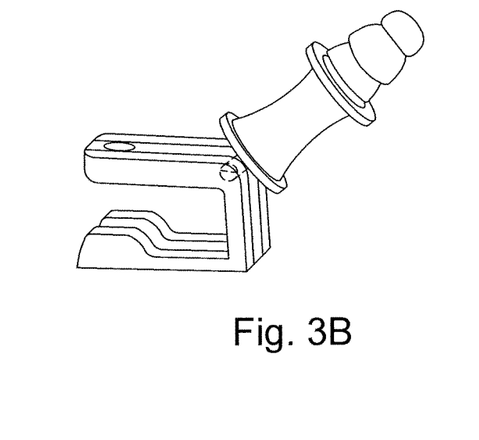
FIG. 3B illustrates a peg entry in track allowing shell skirt to transit exterior of curved surface to reach 90 degree rest.

As illustrated in FIG. 3, in the instance of the internally movable variant, the sound tunnel may be installed through the use of a "one way gate" where the male attaching protrusion of the sound tunnel shell is mechanically forced through an inclined plane or planes at the mouth of each track such that the wedge shaped plane allows the slightly larger protrusion to be forced through the gate at time of manufacture, but because of an abrupt 90 degree face at the terminus of the smooth wedge, removal of the sound tunnel shell protrusion is difficult or impossible. This "snap in" approach allows simple and potentially tool-free creation of a two-part system by semi-skilled workers or robotically at far greater ease of construction and far less expense than any hinged approach to the provision of a movable sound tunnel on a device such as The Cell Spacer.

Another aspect of the invention forms the sound tunnel, or at least the protruding portion (tower) out of an resilient material. In this embodiment, while the tower is unrestricted, for example on a desk, or positioned against a users ear, the tower remains erect and supplies enough resistance to the users ear to maintain the distance comfortably, but when excessive force is experienced, such a bumping into a pedestrian while walking the tower collapses to avoid injuring the user. Similarly with the resilient tower, when the mobile device is placed in a pocket, purse or case, the tower collapses due to the forces applied due to the restricted space.

Additionally, as described previously, the sound tunnel may be nested and retractable within its self, or telescoping.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

The invention claimed is:

1. A physical barrier to prevent unsafe exposure of the user of a mobile device comprising:
   a tube defining a sound passage from a first distal end to the other distal end,
   a base located at the other distal end adapted to interface with an ear piece of the mobile device; said base defining a second opening to receive sound emitted from the ear piece and direct the sound to the sound passage; said base including an engagement device;
   a first opening located proximate to the first distal end, the first opening and the second opening in fluid communication via the sound passage;
   a retaining mechanism adapted to removable attach the physical barrier to the mobile device over the ear piece
   wherein the retaining mechanism comprises a channel which slidably receives the engagement device and allows the tube to traverse along the channel and to tilt from substantially perpendicular to parallel with respect to the ear piece as a result of the traversing.

2. The physical barrier of claim 1, further comprising an ear interface ring proximate the first distal end, the ear interface ring having a greater diameter than an outer diameter of the users ear canal.

3. The physical barrier of claim 1, further comprising an ear bud proximate the first distal end with a diameter less than the diameter of the ear interface ring, wherein the ear bud is located between the first opening and the ear interface ring along the sound passage.

4. The physical barrier of claim 1, further comprising an ear bud proximate the first distal end with a diameter approximately equal to the diameter of the user's outer ear canal.

5. The physical barrier of claim 1, wherein the retaining mechanism is a clip with at least one flexible leg, wherein the at least one leg presses against the mobile device on the opposite side from the ear piece, to attach the physical barrier to the mobile device.

6. The physical barrier of claim 1, further comprising a flange, the flange extending from the base and adapted to engage an outer surface of the mobile device perpendicular to the ear piece surface and adapted to position the base over the earpiece.

7. The physical barrier of claim 1, further comprising a groove proximate the other distal end of the tube, the groove retaining the retaining mechanism to the tube, and wherein the retaining mechanism is an elastic band or strap adapted to engage the mobile device.

8. The physical barrier of claim 1, further comprising one or more flexible legs, wherein the retaining mechanism is mobile device case, and the base is integrated into the mobile device case proximate the ear piece and the one or more flexible legs are integrated in the case proximate the microphone of the mobile device.

9. The physical barrier of claim 1, wherein the retaining mechanism is selected from the group consisting of: hook and loop, clips, clamps, interlocking recesses and protrusions, magnets, suction devices, elastic band and straps.

10. The physical barrier of claim 1, wherein the sound passage defines a cylindrical, conical, parabolic or hyperbolic shape.

11. The physical barrier of claim 1, wherein the retaining mechanism further defines an aperture located between the ear piece and the second opening.

12. A method of maintaining a safe distance between the ear of a user and a mobile device during a wireless communication, comprising:

providing a physical barrier; said physical barrier comprising:

a tube defining a sound passage from a first distal end to the other distal end, a base located at the other distal end adapted to interface with an ear piece of the mobile device; said base defining a second opening to receive sound emitted from the ear piece and direct the sound to the sound passage; said base including an engagement device;

a first opening located proximate to the first distal end, the first opening and the second opening in fluid communication via the sound passage;

a retaining mechanism adapted to removable attach the physical barrier to the mobile device over the ear piece wherein the retaining mechanism comprises a channel which slidably receives the engagement device and allows traverse of the tube along the channel with respect to the retaining mechanism and allows the tube to tilt between substantially perpendicular to parallel with respect to the ear piece as a result of the traversing;

attaching the physical barrier to the mobile device and positioning the physical barrier such that the second opening is proximate the ear piece;

traversing the tube of the physical barrier with respect to the retaining mechanism to a first position perpendicular to the ear piece while the physical barrier remains attached to the mobile device;

traversing the tube of the physical barrier with respect to the retaining mechanism to a second position parallel to the ear piece while the physical barrier remains attached to the mobile device;

wherein the step of moving the tube to a first position is chronologically proximate to a start of the communication; and the step of moving the tube to a second position is chronologically proximate to an end of the communication.

13. The method of claim 12, wherein the retaining mechanism further defines an aperture and the step of positioning the retaining mechanism to be located between the ear piece and the second opening.

* * * * *